Jan. 26, 1960  R. C. OLIVER  2,922,356
MACHINE FOR CONTINUOUSLY PRODUCING PANCAKES AND THE LIKE
Filed April 23, 1957  4 Sheets-Sheet 1

INVENTOR.
ROBERT C. OLIVER
BY
Townsend and Townsend
ATTORNEYS

Jan. 26, 1960  R. C. OLIVER  2,922,356
MACHINE FOR CONTINUOUSLY PRODUCING PANCAKES AND THE LIKE
Filed April 23, 1957  4 Sheets-Sheet 2
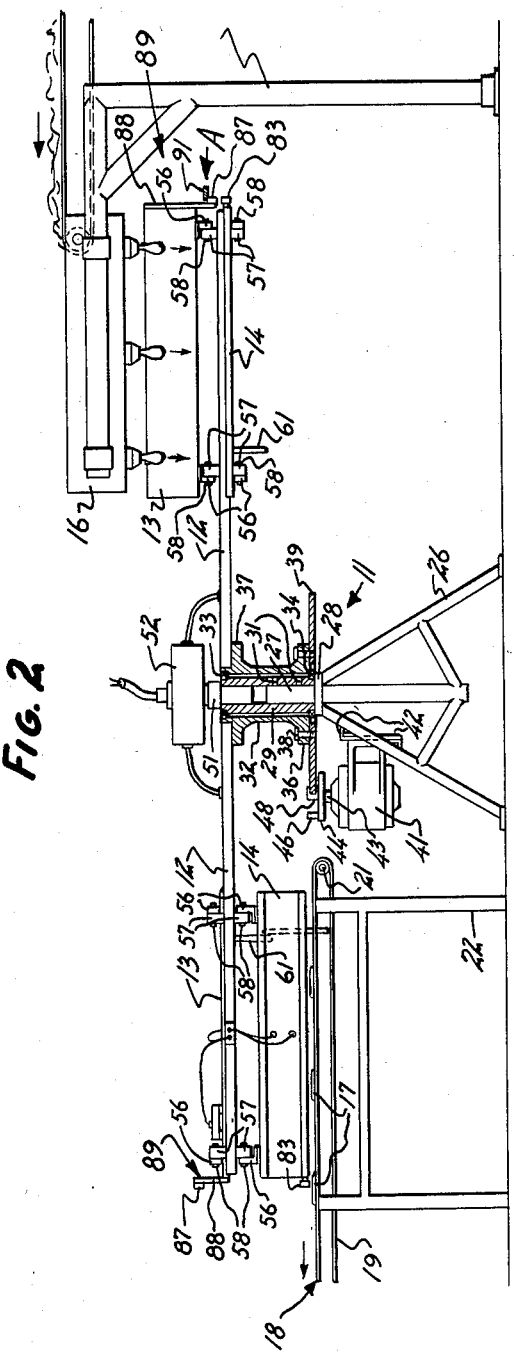
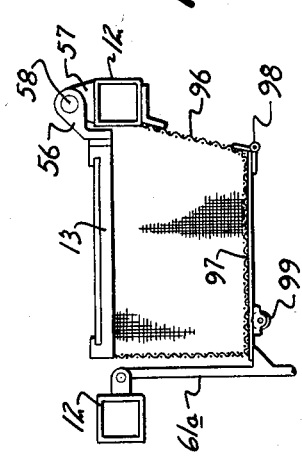
INVENTOR.
ROBERT C. OLIVER
BY
Townsend and Townsend
ATTORNEYS Jan. 26, 1960 R. C. OLIVER 2,922,356
MACHINE FOR CONTINUOUSLY PRODUCING PANCAKES AND THE LIKE
Filed April 23, 1957 4 Sheets-Sheet 3
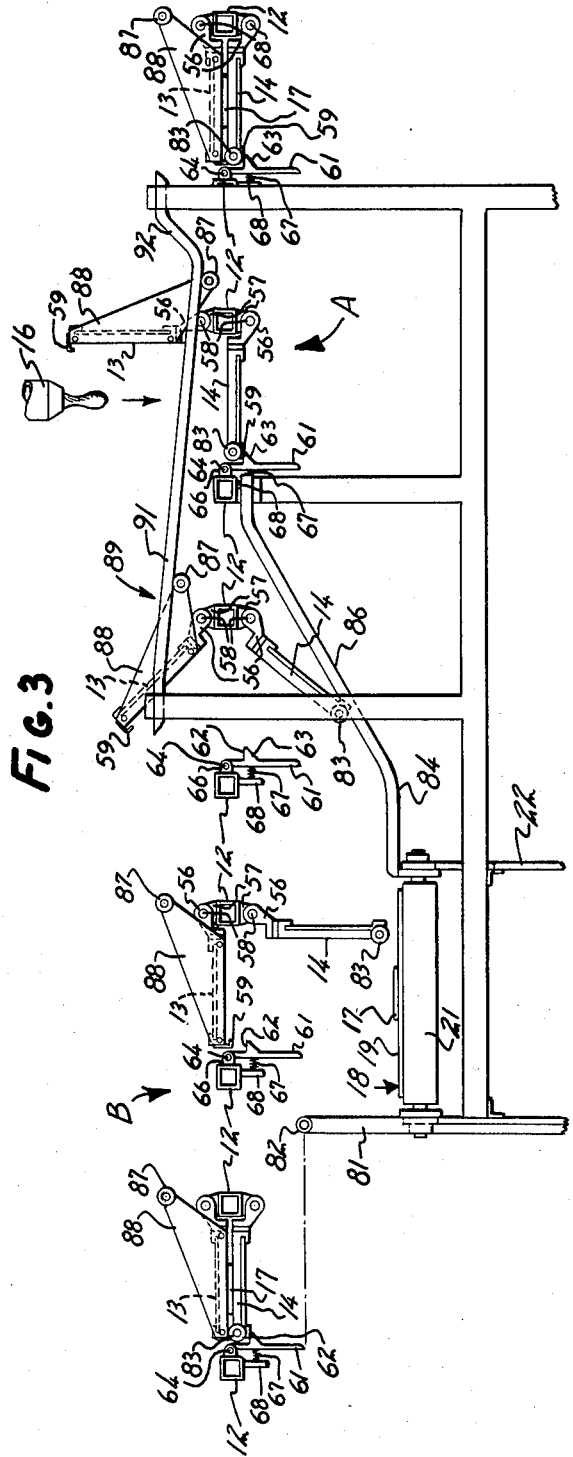
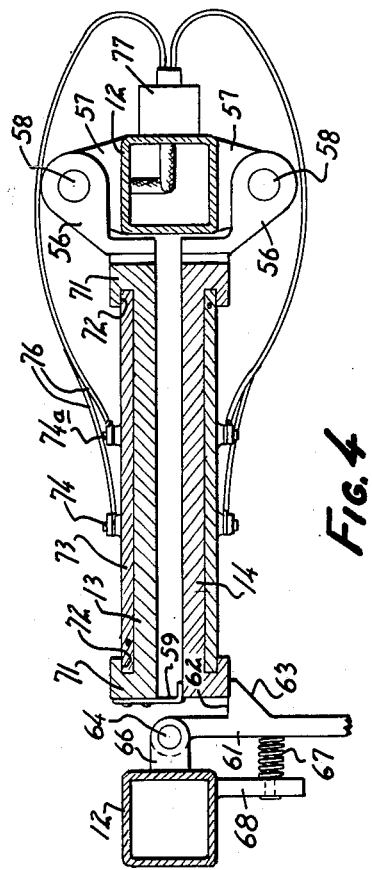
INVENTOR.
ROBERT C. OLIVER
BY
Townsend and Townsend
ATTORNEYS Jan. 26, 1960   R. C. OLIVER   2,922,356
MACHINE FOR CONTINUOUSLY PRODUCING PANCAKES AND THE LIKE
Filed April 23, 1957   4 Sheets-Sheet 4

INVENTOR.
ROBERT C. OLIVER
BY
Townsend and Townsend
ATTORNEYS

United States Patent Office 2,922,356
Patented Jan. 26, 1960

2,922,356

MACHINE FOR CONTINUOUSLY PRODUCING PANCAKES AND THE LIKE

Robert C. Oliver, Hayward, Calif., assignor to Robert A. Johnson, San Jose, Calif.

Application April 23, 1957, Serial No. 654,558

7 Claims. (Cl. 99—373)

This invention relates to a new and improved machine for continuously producing pancakes and the like and has further application to devices in which heat is continuously applied to a plurality of objects over a predetermined heating cycle.

The present invention is illustrated and described herein as embodied in a machine for automatically cooking pancakes on a griddle. The batter is deposited on a lower griddle at one station of the machine whereupon an upper griddle is closed on top of the lower griddle and the batter is heated while the machine revolves until the cooked pancake is brought around to a discharge station, whereupon the lower griddle dumps the pancake onto a conveyor belt which leads to a packaging station. It will be understood that the machine may be used to cook other products or that with slight modification which will readily occur to one skilled in the art, it may be used to dry painted objects or perform other operations where a fixed heating cycle is required.

A principal object of the present invention is the provision of a pair of griddles or other heating elements hingedly connected to radially extending arms of a revolving turret, together with means for moving the griddles about their hinged connections in timed sequence as the machine revolves.

A further feature of the invention is the provision of a machine having a cycle of operations wherein the top griddle is opened at the filling station to permit batter to be deposited on the lower griddle, whereupon the top griddle is closed to expedite cooking of the batter. At the end of the cooking cycle the bottom griddle is moved to vertical position allowing the cooked pancakes to fall onto a conveyor which removes the same. Accordingly the present invention permits mechanical deposit of batter and removal of cooked pancakes without manual operation.

Another feature of the invention is intermittent movement of the turret from which the radial arms project, which permits the lower griddle to remain stationary while the filling operation is being performed.

Other objects of the present invention will become apparent upon reading the following specification and referring to the accompanying drawings in which similar characters of reference represent corresponding parts in each of the several views.

In the drawings:

Fig. 2 is a vertical sectional view taken substantially along line 2—2 of Fig. 1;

Fig. 3 is a side elevation as viewed along line 3—3 of Fig. 1;

Fig. 4 is an enlarged fragmentary vertical sectional view taken substantially along line 4—4 of Fig. 1;

Fig. 5 is a view similar to Fig. 4 of a modification of the machine; and

Figure 1:
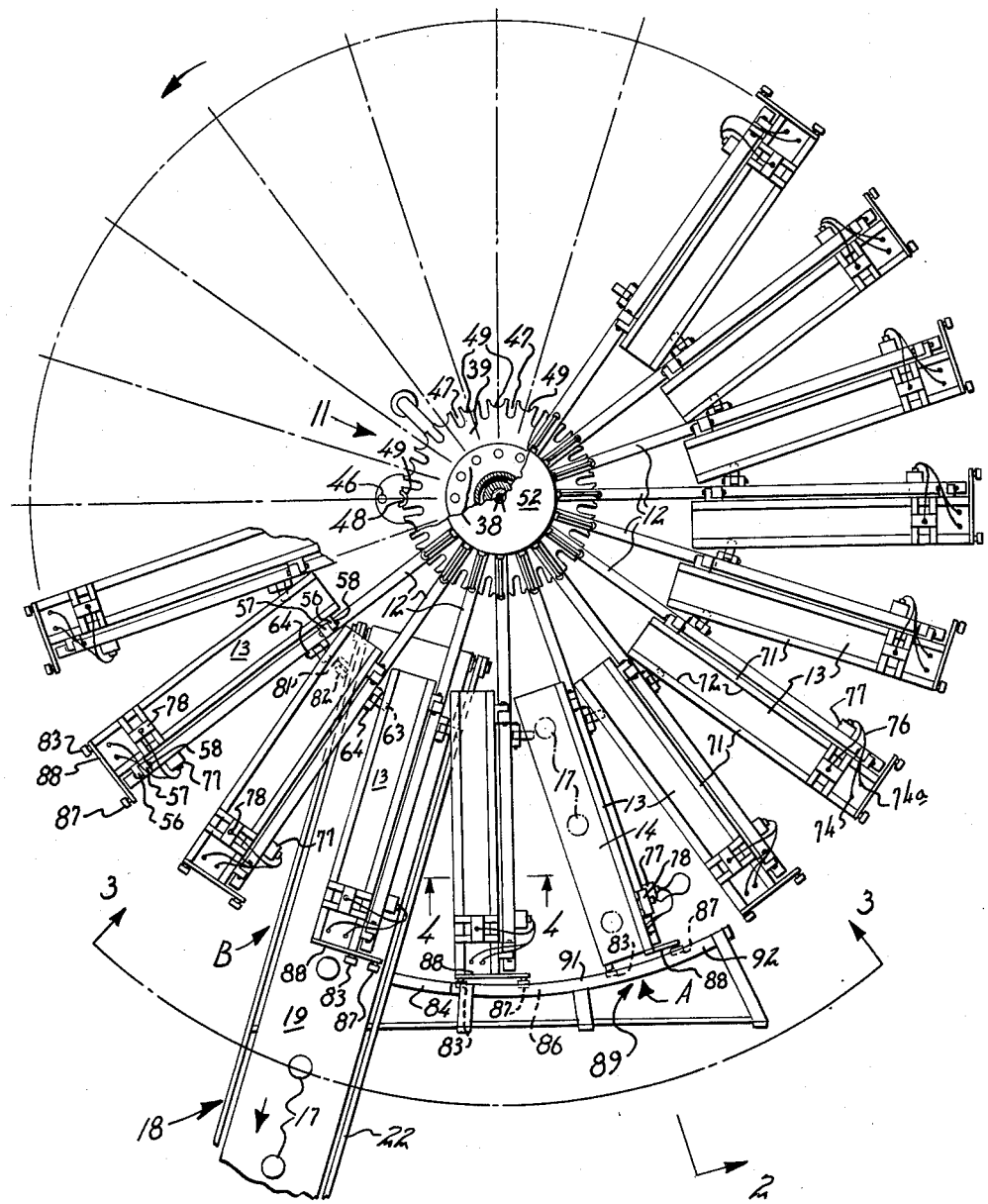
Fig. 1 is a top plan of the machine partly broken away in section.

The present invention employs a rotary turret 11 from which radially extend a plurality of arms 12 to the outer ends of which are hingedly connected upper and lower griddles 13 and 14, respectively. The two griddles 13 and 14 may be moved from horizontal cooking position to vertical position by cam actuation as hereinafter described in detail. The turret 11 is caused to revolve in an intermittent motion. At filling station A, the machine may be provided with a multi-spout filler 16 positioned over the griddles which drops a measured quantity of batter from each of the plurality of nozzles. Three nozzles are shown in the accompanying drawings, but it will be understood that this number is subject to considerable variation. At filling station A bottom griddle 14 is held horizontal while top griddle 13 is vertical, permitting the batter to fall from filler 16 onto bottom griddle 14 by gravity. As the machine indexes, top griddle 13 is closed, thus heating the batter between the top and bottom griddles as the machine intermittently revolves. At the end of its cycle the griddles reach the discharge station B, whereupon lower griddle 14 is unlatched, which causes the cooked pancakes 17 to fall by gravity onto belt conveyor 18 which moves the product to a packaging station. Thereafter the packaged pancakes may be frozen or otherwise handled for merchandising. Conveyor 18 comprises an endless belt 19 running around pulley 21 at the end nearest turret 11 and supported by frame 22. The driving means for belt 19 is not illustrated.

The machine comprises a number of different elements which will be hereinafter described in detail.

The turret

Turret 11 is mounted on a tripod 26 having upwardly extending vertical stub shaft 27 formed with shoulder 28 to support inner sleeve 29 fixed to shaft 27 by means of set screws 31. Surrounding sleeve 29 is an outer sleeve 32 which is rotatably mounted with respect to inner sleeve by means of upper and lower bearings 33 and 34. Outer sleeve 32 is provided with lower and upper flanges 36 and 37 welded thereto. Lower flange 36 is fixed by means of screws 38 to a horizontally disposed Geneva driven wheel 39. Motor 41 having an integral speed reduction is supported from tripod 26 by means of brackets 42. The shaft 43 of motor 41 is vertical and the upper end carries a Geneva drive pinion 44. Pinion 44 has an upwardly projecting pin 46 which drives the Geneva driven wheel 39 by engaging peripheral radial slots 47 and is also provided with a semicircular stop 48 which engages arcuate cutouts 49 in the edge of wheel 39 intermediate slots 47 and holds wheel 39 stationary during the time interval when pin 46 is not indexing the wheel. Accordingly, as motor 41 turns continuously it intermittently drives outer sleeve 32 and flange 37.

Inner sleeve 29 is further provided with an upper vertical shaft 51 carrying a collector ring assembly 52. Fastened to upper flange 37 and projecting radially relative to turret 11 is a plurality of radial support arms 12, there being in the embodiment shown in Fig. 1 twenty such arms. Arms 12 are preferably hollow squares in cross section and revolve intermittently with outer sleeve 32.

The griddle construction

Adjacent the outer end of each radial arm 12 are upper and lower griddles 13 and 14, respectively. Each griddle carries at opposite ends a hinge leaf 56 and the top and bottom surface of each arm 12 is provided with a cooperating pair of hinge leaves 57. Each pair of hinge leaves is connected together by a hinge pin 58. Thus upper griddle 13 can be swung from horizontal cooking position to vertical upward position and similarly lower griddle 14 can be swung from horizontal to vertically downward position. The griddles are held in parallel spaced relationship by means of spacer fingers 59 fixed to upper griddle 13 and resting on lower griddle 14.

Lower griddle 14 is held in horizontal position by means of latch 61 having a horizontal top support surface 62 and an oblique undersurface 63 hingedly connected by means of pin 64 to bracket 66 on adjacent radial arm 12. (See Fig. 4.) Latch support surface 62 normally engages under the lower surface of bottom griddle 14 and supports the same horizontally. Latch 61 is biased outwardly to support position by means of spring 67 bearing against both latch 61 and vertical spring support 68 likewise attached to adjacent radial arm 12.

Figure 6:
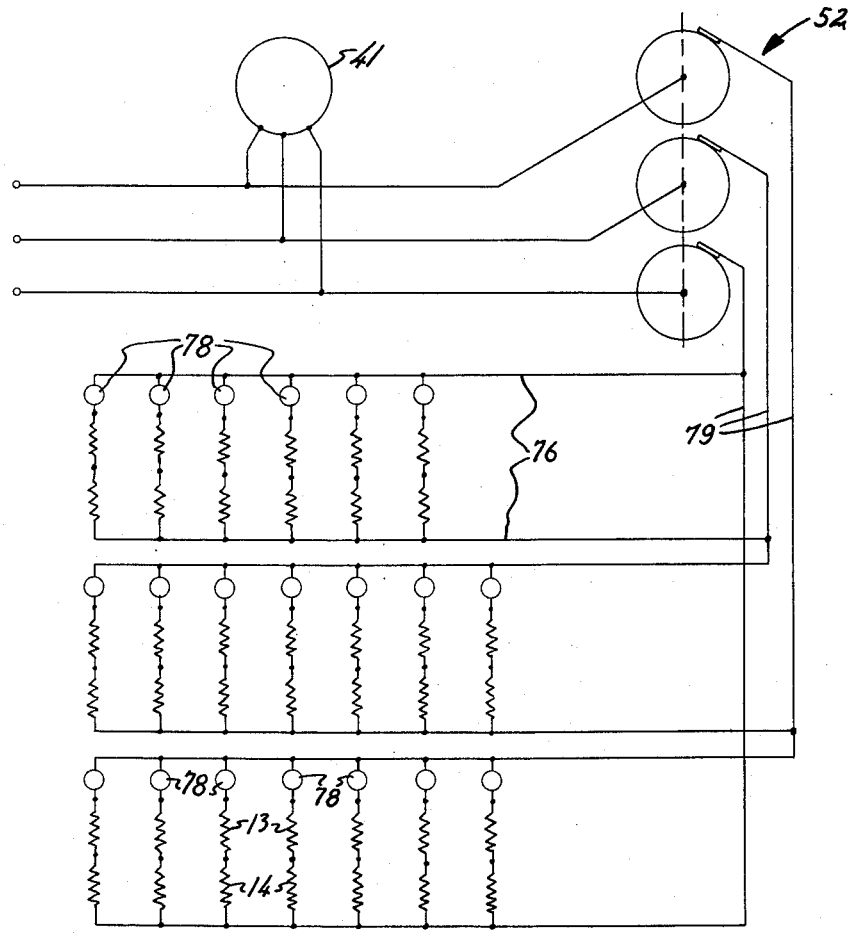
Fig. 6 is a wiring diagram.

The longitudinal edges of the outside surfaces of each griddle are formed with marginal projections 71 on the inner edges of which are cut grooves 72. The longitudinal edges of heating elements 73 are slidably received in the grooves 72 and elements 73 are thus in contact with and heat the griddle. Heating elements 73 are standard commercially available items formed of di-electric material in which heating coils are embedded. Terminals 74, 74ª are connected to the ends of the coils and are in turn connected by means of flexible wires 76 through thimbles 77 in radial arms 12. As shown particularly in Figs. 1 and 6, thermostatic element 78 is in contact with each upper griddle 13 and in series with the coils of griddles 13 and 14 associated therewith so as to maintain a pre-selected temperature. A lead wire 79 runs to collector ring 52. Collector ring 52 functions in such manner that all of the heating elements are continuously heated as the machine revolves. A three phase wiring system distributes the load among the twenty sets of griddles as shown in wiring diagram, Fig. 6.

Griddle actuating mechanism

Adjacent conveyor 18 is an upwardly extending latch engaging abutment 81 provided with a roller 82 at its upper end. As shown particularly in Fig. 3, as the sets of griddles revolve, the lower end of latch 61 is engaged by roller 82 and moved away from the griddle which it supports against the pressure of spring 67, thereby permitting bottom griddle 14 to fall down to vertical position to dump the pancakes on conveyor belt 19. When the sets of griddles have moved beyond conveyor 18, roller 83 on the outer end of lower griddle 14 engages lower cam 84 which has an upwardly inclined ramp 86 which raises lower griddle 14 until it assumes a horizontal position and is latched by latch 61. Simultaneously roller 87 on the outer end of triangular shaped mounting bracket 88 attached to upper griddle 13 engages under upper cam 89 which has a downwardly inclined ramp 91 to raise the upper griddle 13 and thus to be in proper position under the dispensing station 16 to receive the batter. Immediately beyond the dispensing station upper cam 89 has an upward inclined ramp 92 permitting upper griddle 13 to assume a horizontal position.

A modification of the invention is shown in Fig. 5. In this modification an upper griddle 13 is provided which is similar in construction to the upper griddle of the modification of Figs. 1-4, inclusive. However, the lower griddle is replaced by a basket 96. The bottom 97 of the basket is hinged by means of hinge 98 to the front edge thereof. Latch 61ª engages under bottom 97 of basket 96. Roller 99 on the bottom of basket 96 functions in the same manner as roller 83. This modification may be employed to dry or heat objects or perform like operations where a fixed heating cycle is required, in which case the dough feeder 16 may be eliminated.

Although the foregoing invention has been described in some detail by way of illustration and example for purposes of clarity of understanding, it is understood that certain changes and modifications may be practiced within the spirit of the invention and scope of the appended claims.

What is claimed is:

1. In a machine for applying heat to articles for heat treatment thereof, a conveyor, means for mounting said conveyor for movement in a horizontal path about a vertical axis, said conveyor having a feed station and a discharge station, feed means for feeding articles into said feed station, discharge means for removing articles from said discharge station, a plurality of top electric heating elements fastened to said conveyor, said top heating elements being movable between opened and closed positions, a plurality of article-receiving members corresponding in number to said top heating elements and positioned immediately thereunder, said article receiving members being movable between horizontal and discharge positions, first stationary cam means, second cam means on said top heating elements, said first and second cam means being engageable for opening said top heating elements at said feed station to permit articles to be dropped from said feed means onto said article-receiving members, latch means on said conveyor for holding said article-receiving members in horizontal position, unlatching means operable to disengage said latch means to permit said article-receiving members to discharge articles from said conveyor at said discharge station, means for supplying electric current to said heating elements as said conveyor moves, and drive means for actuating said conveyor means.

2. Apparatus according to claim 1 in which said drive means moves said conveyor means intermittently.

3. An automatic cooking machine comprising a conveyor, means for moving said conveyor in a horizontal path about a vertical axis of rotation, said conveyor having a plurality of arms, a plurality of top griddles, first hinge means hingedly mounting a top griddle to each of said arms, a plurality of article-receiving members corresponding in number to said top griddles, second hinge means hingedly mounting an article-receiving member to each said arm immediately below a top griddle, a cam follower connected to said top griddle, a stationary cam engageable by said cam to raise said top griddle about said first hinge means to vertical position at a first station along the path of travel of said conveyor to permit deposit of articles on an article-receiving member and to close said top griddle when said griddle moves beyond said first station, latch means on said conveyor engaging said article-receiving member to hold said member substantially horizontal, stationary unlatching means engageable with said latch means to unlatch said article-receiving member to descend to a vertical position at a second station of said machine, and second cam means engageable with said article-receiving member to return said article-receiving member to horizontal latched position beyond said second station.

4. An automatic cooking machine in accordance with claim 3 wherein said article-receiving member is a bottom griddle.

5. An automatic cooking machine according to claim 3 wherein said article-receiving member is a basket, said basket having a hinged bottom.

6. An automatic cooking machine according to claim 3 in which said top griddles contain electric heating elements and which further comprises means for supplying electric current to said electric heating elements while said conveyor moves.

7. A machine for heating pancakes and the like comprising a rotary turret, means for rotating said turret, a plurality of arms extending substantially radially from said turret, each of said arms adjacent its outer end having first and second hinge means, a plurality of top griddles hingedly connected to said first hinge means, a plurality of bottom griddles hingedly connected to said second hinge means immediately below said top griddles, a cam follower on said top griddle, a top cam mounted along the path of travel of said cam follower adjacent a feed station and arranged to engage said cam followers to open said top griddles at said feed station and to close said top griddles beyond said feed station, latch means on said conveyor engaging said bottom griddles normally to hold said bottom griddles in substantially horizontal position, unlatching means stationarily mounted adjacent the path of travel of said latch means at a discharge station and engageable with said latch means to unlatch said bottom griddle to descend to vertical position ahead of said discharge station, second cam followers on said bottom griddles, and a stationary second cam adjacent said discharge station and arranged to engage said second cam followers beyond said discharge station and raise said bottom griddles to horizontal position beyond said discharge station and in advance of said feed station.

References Cited in the file of this patent

UNITED STATES PATENTS

| | | |
|---|---|---|
| 1,344,285 | Wolff | June 22, 1920 |
| 1,507,883 | Campbell | Sept. 9, 1924 |
| 1,757,983 | Tugendhat | May 13, 1930 |
| 1,899,302 | Balton | Feb. 28, 1933 |
| 2,048,011 | Leaf | July 21, 1936 |
| 2,563,866 | Puls | Aug. 14, 1951 |
| 2,732,584 | Bishop | Jan. 31, 1956 |

FOREIGN PATENTS

| | | |
|---|---|---|
| 35,559 | Switzerland | Oct. 25, 1905 |